United States Patent
Virtanen

(10) Patent No.: US 7,473,454 B2
(45) Date of Patent: Jan. 6, 2009

(54) LAMINATE, A SELF-ADHESIVE LABEL WEB AND A METHOD FOR MANUFACTURING

(75) Inventor: Kari Virtanen, Asheville, NC (US)

(73) Assignee: Raflatac Oy (FI)

( * ) Notice: Subject to any disclaimer, the term of this patent is extended or adjusted under 35 U.S.C. 154(b) by 0 days.

(21) Appl. No.: 11/232,676

(22) Filed: Sep. 22, 2005

(65) Prior Publication Data

US 2006/0078703 A1    Apr. 13, 2006

Related U.S. Application Data

(63) Continuation of application No. PCT/FI2004/000178, filed on Mar. 29, 2004.

(30) Foreign Application Priority Data

Apr. 1, 2003    (FI) .................................. 20030489

(51) Int. Cl.
*B32B 9/00*    (2006.01)
*B32B 33/00*    (2006.01)
(52) U.S. Cl. .................. 428/40.1; 428/41.5; 428/41.8
(58) Field of Classification Search ................ 428/40.1, 428/41.5, 41.8, 220
See application file for complete search history.

(56) References Cited

U.S. PATENT DOCUMENTS

| 5,167,995 | A | 12/1992 | Johnson et al. |
| 5,183,833 | A * | 2/1993 | Fisher et al. ................ 522/182 |
| 5,194,455 | A | 3/1993 | Massow et al. |
| 5,330,812 | A | 7/1994 | Knoerzer et al. |
| 5,700,571 | A | 12/1997 | Logue et al. |
| 6,110,552 | A | 8/2000 | Casey et al. |
| 6,228,449 | B1 | 5/2001 | Meyer |
| 6,306,475 | B1 * | 10/2001 | Stocq et al. ................. 428/40.1 |
| 6,780,371 | B2 * | 8/2004 | Shibano et al. ............. 264/446 |
| 6,818,271 | B2 | 11/2004 | Fearn et al. |
| 2001/0030020 | A1 | 10/2001 | Nandy et al. |
| 2003/0077442 | A1 | 4/2003 | Inokuchi et al. |

FOREIGN PATENT DOCUMENTS

| DE | 19628294 | 1/1998 |
| EP | 1078966 | 2/2001 |
| JP | 59071381 | 4/1984 |
| WO | WO 96/30886 | 10/1996 |
| WO | WO 99/55517 | 11/1999 |

* cited by examiner

*Primary Examiner*—Patricia L Nordmeyer
(74) *Attorney, Agent, or Firm*—Fitch, Even, Tabin & Flannery

(57) ABSTRACT

The present invention relates to a laminate to be used in manufacturing of self-adhesive labels, and comprising a face material, a backing material of polyolefin including a release layer, and an adhesive layer, which have been used for attaching the face material and the backing material together in such a manner that the release layer of the backing material contacts with the adhesive layer. The face material is of polyolefin, and the adhesive layer comprises a solvent-free radiation curable hot melt adhesive. The present invention also relates to a self-adhesive label web comprising successive plastic labels, and a method for manufacturing a laminate to be used in manufacturing of self-adhesive labels.

7 Claims, 1 Drawing Sheet

LAMINATE, A SELF-ADHESIVE LABEL WEB AND A METHOD FOR MANUFACTURING

This is a continuation of prior application Ser. No. PCT/FI2004/000178 filed on Mar. 29, 2004, designating the United States, claiming priority from Finland patent application No. 20030489, filed Apr. 1, 2003. International application No. PCT/FI2004/000178 is hereby incorporated by reference in its entirety.

FIELD

The present invention relates to a laminate to be used in manufacturing of self-adhesive labels, and comprising a face material, a backing material of polyolefin including a release layer, and an adhesive layer, which have been used for attaching the face material and the backing material together in such a manner that the release layer of the backing material contacts with the adhesive layer. The present invention also relates to a self-adhesive label web comprising successive plastic labels on a polyolefin backing web including a release layer, the plastic labels being attached to the polyolefin backing web by an adhesive layer and a method for manufacturing a laminate to be used in manufacturing of self-adhesive labels, and comprising a face material web, a backing material web of polyolefin including a release layer, and an adhesive layer.

BACKGROUND

There are certain advantages to use polyolefin backing materials, especially orientated polypropylene. The orientated polypropylene (OPP) as the backing material makes it possible to use high labeling speeds compared to paper materials because OPP has good tensile strength. The process is also more reliable compared to that with paper materials, which can easily break. In contrast to both paper and polyester, the backing material of orientated polypropylene is cheaper, and the backing films of OPP can be substantially thinner than that of polyester, which means more label material per volume.

The use of the OPP film as a backing web is known from WO 96/30886. In that publication, either OPP, paper, or polyester is used as the backing web of a peelable web. The backing web comprises a release layer. A hot melt adhesive is applied on one surface of the peelable web, and the webs are attached to each other. The peelable web may be a paper web.

In plastic containers, such as cans or bottles, are often used plastic labels provided with printed information. Such containers are used especially for packaging cosmetic products, which require pleasant appearance, and thus the label should preferably be except the printed area as invisible as possible compared to the surface to which it is attached. In practice, the aforesaid fact means that the label is of plastic material, and it is either transparent or possesses the same colour as the container. Polyolefin labels are especially suitable for this use because they are clear, and possible to process as thin films.

Publication WO 99/55517 discloses a clear or opaque label product, which comprises a polypropylene or polyethylene film as a top material, a release liner, and a pressure-sensitive adhesive between the top material and the release liner. The pressure-sensitive adhesive can be UV-curable. The release liner is of polyester, and the pressure-sensitive adhesive is applied on the release liner.

The problem of the prior label products is that there is no way to produce a laminate in which both the face material and the backing material are of polyolefin. Polyolefines do not resist temperature very well, and therefore adhesives, which have to be applied and/or cured with heat, must be applied on a surface other than the polyolefin surface. Especially thin backing materials of polyolefin, such as OPP, are very vulnerable to process conditions. Some adhesives are used with polyolefins but the use of water-based adhesives or solvent-based adhesives is not advantageous because due to restricted process temperature it takes a long time to dry the adhesive, and still problems with stretchy backing film occur, which causes problems in cutting and punching. Further, solvent-based adhesives are harmful, and need recovery and/or burning systems. Rubber-based hot melt adhesives are unsuitable for plastic laminates, and further, they are also unsuitable for use with transparent face materials because they do not resist UV light.

SUMMARY

The laminate of the invention is a new solution in the field of labels. The laminate of the invention is characterized in that the face material is of polyolefin, and the adhesive layer comprises a solvent-free radiation curable hot melt adhesive. The self-adhesive label web is characterized in that the face material is of polyolefin, and the adhesive layer comprises a solvent-free radiation curable hot melt adhesive. The method for manufacturing is characterized in that the face material web is of polyolefin, and the adhesive layer is formed from a solvent-free radiation curable hot melt adhesive, which is applied on either of the polyolefin material webs.

In this application, the term radiation curable adhesive covers among others UV-curable adhesives and EB-curable (electron beam curable) adhesives.

DETAILED DESCRIPTION

Figure 1:
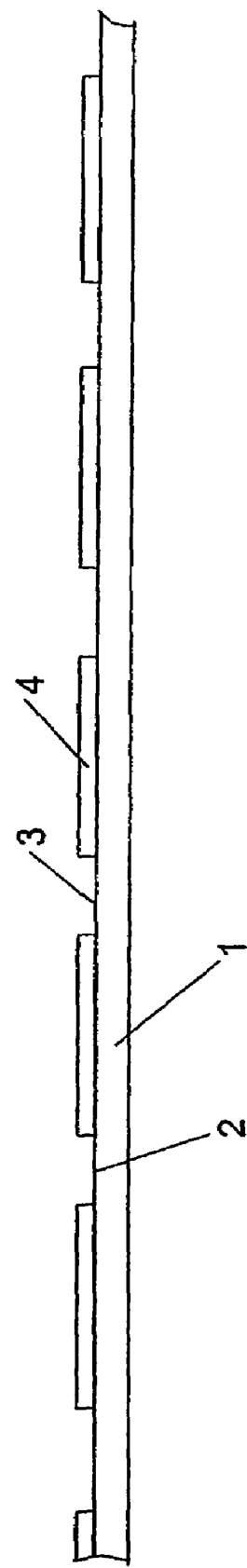
FIG. 1 is a cross section of the label web.

The laminate of the invention is used for labels to be used on plastic containers, such as cans or bottles. Such containers are used especially for packaging cosmetic products, which require pleasant appearance, and thus the label should preferably be except the printed area as invisible as possible compared to the surface to which it is attached. Preferably the edges of the label are as invisible as possible, thus providing an effect that the printing is made directly on the surface of the container. In practice, the aforesaid fact means that the face material is of thin plastic material, and it is either transparent or possesses the same colour as the container. A preferred thin plastic material is a polyolefin material because it is clear and easily formable to the shape of the container. The thickness of the face material can be around 0,05 mm.

The printing to the label may be done either to the front or the back side of the label if the label is transparent but preferably it is done to the front side of the label. An excess protective layer on the printed area may be required.

The backing material of the laminate is of polyolefin, too. Preferably the backing material is of orientated polypropylene (OPP). The orientated polypropylene as the backing material makes it possible to use high labeling speeds compared to paper materials because OPP has good tensile strength. The process is also more reliable compared to that with paper materials, which can be easily break. In contrast to both paper and polyester, the backing material of orientated polypropylene is cheaper, and the backing films of OPP can be substantially thinner than those of polyester or paper, which means more label material per volume. The thickness of the backing material is typically at the most 50 μm, and preferably 20-30 μm.

The adhesive layer between the polyolefin materials is formed of a solvent-free radiation curable hot melt adhesive, preferably a solvent-free UV-curable hot melt adhesive. The adhesive can comprise for example acrylic copolymer. The adhesive is applied on either the face material or the backing material, preferably it is applied on the backing material due to the thinness of the face material. The backing material includes a release layer on that side of the backing material, which receives the adhesive layer. The release layer can be formed on the same production line before forming the adhesive layer. The release layer is preferably formed of a UV-curable silicone.

The face material and the backing material are preferably in web form, and the process for manufacturing the laminate is preferably continuous. The adhesive is heated to a temperature, which is between 120 and 140° C., and it is applied on the polyolefin material. Preferably it is applied by a slot die from which the molten adhesive flow to the running polyolefin material forming the adhesive layer on it. The adhesive layer is cured by using UV-light, and hence the only heat load directed to the polyolefin material is the one caused by the molten adhesive.

After the adhesive layer is cured, the face material and the backing material are attached together preferably in a nip formed between two rolls. The ready laminate is used for manufacturing self-adhesive labels. The face material is die cut in such a manner that individual labels are formed on the backing material. The excess face material between the labels is removed.

A web comprising successive self-adhesive labels on a continuous backing material is delivered to the labeling line of the containers, or the containers are labeled in the same production line as they are manufactured. One label after another is released from the backing material, and attached to a container.

In the following, the invention is described by an example and a figure, which shows a cross-section of a self-adhesive label web.

The figure shows the structure of the self-adhesive label web. There is a backing material web 1 comprising a release layer 2 on its upper surface. On the release layer is formed an adhesive layer 3. Labels 4 are formed from a face material by punching it, and removing the excess material.

EXAMPLE

A polyolefin face material and a polyolefin backing material were used to form a laminate. The face material can be polypropylene, orientated polypropylene (OPP), or polyethylene. The backing material was of orientated polypropylene (OPP), and it comprised a release layer.

A UV-reactive, solvent-free acrylic copolymer (acResin A 203 UV, producer BASF, Germany) was applied on the backing material to form an adhesive layer.

The adhesive was applied through a slot die in a temperature, which can vary between 120 and 140° C. After application, the adhesive layer was irradiated with UV light. For crosslinking, the wavelengths below 340 nm are suitable. The preferred range is between 250 and 260 nm.

The face material and the backing material were attached together to form a laminate to be used in manufacturing of self-adhesive labels used especially in containers of cosmetic products.

The embodiment described above does not restrict the scope of the invention. There are various ways to modify the invention. The main idea is that it is possible to manufacture a self-adhesive label web in which both the face material and the backing material are of heat-sensitive polyolefin.

The invention claimed is:

1. A laminate to be used in manufacturing of self-adhesive labels, and comprising:
   a face film selected from the group consisting of polypropylene, orientated polypropylene and polyethylene;
   an oriented polypropylene backing film having a thickness in the range of from about 20 to 30 μm;
   a release composition on the surface of the backing film;
   a solvent-free UV-curable adhesive on the surface of the release composition, the adhesive releasably affixing the face film to the backing film.

2. The laminate according to claim 1, wherein the UV-curable adhesive includes an acrylic copolymer.

3. A self-adhesive label web comprising successive die cut labels arrayed on a backing layer, the labels comprising:
   a face film selected from the group consisting of polypropylene, orientated polypropylene and polyethylene;
   the backing layer which is an oriented polypropylene film having a thickness of less than 50 μm;
   a release composition on the surface of the backing film;
   a solvent-free UV-curable adhesive on the surface of the release composition, the adhesive releasably affixing the face film to the backing film.

4. The label web according to claim 3, wherein the backing film is from 20 to 30 μm thick.

5. The label web according to claim 3, wherein the UV-curable adhesive includes an acrylic copolymer.

6. A self-adhesive label web comprising successive die cut labels arrayed on a backing layer, the labels comprising:
   a face film selected from the group consisting of polypropylene, orientated polypropylene and polyethylene;
   the backing layer which is an oriented polypropylene film having a thickness of 20 to 30 μm;
   a release composition on the surface of the backing film;
   a solvent-free UV-curable acrylic polymer adhesive on the surface of the release composition, the adhesive releasably affixing the face film to the backing film.

7. The label web according to claim 6, wherein the solvent-free UV-curable acrylic polymer adhesive is a UV-curable copolymer.

* * * * *